US011873676B2

(12) United States Patent
Haring

(10) Patent No.: US 11,873,676 B2
(45) Date of Patent: Jan. 16, 2024

(54) PANE UNIT AND METHOD USED TO PRODUCE AND/OR SUPPLY SUCH A PANE UNIT

(71) Applicant: Glass Technology GmbH, Vienna (AT)

(72) Inventor: Heinz Haring, Vienna (AT)

(73) Assignee: Glass Technology, Vienna (AT)

( * ) Notice: Subject to any disclaimer, the term of this patent is extended or adjusted under 35 U.S.C. 154(b) by 196 days.

(21) Appl. No.: 17/425,032

(22) PCT Filed: Jan. 28, 2020

(86) PCT No.: PCT/EP2020/052029
§ 371 (c)(1),
(2) Date: Jul. 22, 2021

(87) PCT Pub. No.: WO2020/157058
PCT Pub. Date: Aug. 6, 2020

(65) Prior Publication Data
US 2022/0145695 A1 May 12, 2022

(30) Foreign Application Priority Data
Jan. 30, 2019 (DE) ..................... 10 2019 102 291.6
Nov. 13, 2019 (DE) ..................... 10 2019 130 580.2

(51) Int. Cl.
*E06B 3/96* (2006.01)
*E06B 3/66* (2006.01)
(Continued)

(52) U.S. Cl.
CPC .............. *E06B 3/9644* (2013.01); *E06B 3/24* (2013.01); *E06B 3/6722* (2013.01);
(Continued)

(58) Field of Classification Search
CPC ...... E06B 3/964; E06B 3/9641; E06B 3/9642; E06B 3/9644; E06B 3/9649;
(Continued)

(56) References Cited

U.S. PATENT DOCUMENTS 3,717,955 A * 2/1973 Urbanick .............. E06B 3/9644
49/495.1
9,250,382 B2 2/2016 Ayoub et al.
(Continued)

FOREIGN PATENT DOCUMENTS

AU 2013100475 A4 * 5/2013 ............... A47K 3/30
BR 102019026124 A2 * 6/2021 ............. E06B 3/964
(Continued)

OTHER PUBLICATIONS

PCT Application: PCT/EP2020/052029—Filed Jan. 28, 2020—English Translation of International Preliminary Report on Patentability dated Jul. 27, 2021.
(Continued)

*Primary Examiner* — Ryan D Kwiecinski
(74) *Attorney, Agent, or Firm* — Simmons Perrine Moyer Bergman PLC

(57) ABSTRACT

Disclosed is a pane unit (10), which comprises a frame structure (12) formed from a plurality of profiles (14), at least two outer panes (16, 16'), and at least one middle pane (18). The panes are each connected or attached to the frame structure (12). The pane unit (10) moreover comprises at least one functional element (20) used for the illumination of the at least one middle pane (18), which functional element (20) is inserted into at least one chamber (24) provided in the profiles (14). The plurality of profiles (14) are coupled with each other by at least one connection element (28), wherein
(Continued)

the at least one connection element (28) engages with the profiles (14) in such a manner that the pane unit (10) is hermetically sealed.

18 Claims, 2 Drawing Sheets

(51) Int. Cl.

| | |
|---|---|
| ***F21V 33/00*** | (2006.01) |
| ***E06B 3/964*** | (2006.01) |
| ***E06B 3/24*** | (2006.01) |
| ***E06B 3/67*** | (2006.01) |
| ***E06B 3/968*** | (2006.01) |
| ***E06B 9/24*** | (2006.01) |

(52) U.S. Cl.
CPC .......... *E06B 3/9641* (2013.01); *E06B 3/9681* (2013.01); *E06B 9/24* (2013.01); *F21V 33/006* (2013.01); *E06B 3/6621* (2013.01); *E06B 2009/2464* (2013.01)

(58) Field of Classification Search
CPC ............... E06B 3/9681; E06B 3/66366; E06B 3/66376; F21V 33/006
See application file for complete search history.

(56) References Cited

U.S. PATENT DOCUMENTS

| | | | | |
|---|---|---|---|---|
| 9,915,401 | B2 * | 3/2018 | Russikoff | F21S 4/28 |
| 10,890,027 | B2 * | 1/2021 | Kotiadis | E06B 3/9682 |
| 11,085,231 | B2 * | 8/2021 | Haring | B32B 17/10036 |
| 11,286,710 | B2 * | 3/2022 | Pedersen | E06B 3/5409 |
| 11,466,508 | B2 * | 10/2022 | Sala | E06B 3/66319 |
| 11,513,337 | B2 * | 11/2022 | Matuszewski | G02B 26/02 |
| 11,578,846 | B2 * | 2/2023 | Russikoff | F21V 21/005 |
| 11,713,613 | B2 * | 8/2023 | Neander | E06B 3/9641 52/204.593 |
| 2002/0044823 | A1 * | 4/2002 | Sosa | F16B 7/18 403/382 |
| 2007/0177391 | A1 * | 8/2007 | Davis | F21V 33/006 362/145 |
| 2011/0194886 | A1 * | 8/2011 | Wu | E06B 3/9641 403/23 |
| 2019/0257141 | A1 * | 8/2019 | Kotiadis | E06B 3/9645 |
| 2020/0263489 | A1 * | 8/2020 | Feil | E06B 3/968 |
| 2020/0408033 | A1 * | 12/2020 | Haring | E06B 3/6612 |
| 2022/0026052 | A1 * | 1/2022 | Keller | G02B 6/0095 |
| 2022/0049542 | A1 * | 2/2022 | Wagemans | E06B 3/968 |
| 2022/0098924 | A1 * | 3/2022 | Liebscher | E06B 3/9636 |
| 2022/0145695 | A1 * | 5/2022 | Haring | E06B 3/9681 |

FOREIGN PATENT DOCUMENTS

| | | | | | |
|---|---|---|---|---|---|
| CN | 105909142 | A | * | 8/2016 | |
| CN | 106894723 | A | * | 6/2017 | |
| CN | 108868496 | A | * | 11/2018 | |
| CN | 109538079 | A | * | 3/2019 | |
| CN | 111042710 | A | * | 4/2020 | E06B 3/964 |
| DE | 19707951 | A1 | * | 9/1998 | E05D 15/0669 |
| DE | 10146604 | A1 | * | 7/2002 | A47B 97/00 |
| DE | 102019118994 | A1 | * | 1/2021 | E06B 3/06 |
| EP | 3660258 | A1 | * | 6/2020 | E06B 3/9649 |
| EP | 3683376 | A1 | * | 7/2020 | E04D 13/031 |
| EP | 3708759 | A1 | * | 9/2020 | |
| EP | 3875728 | A1 | * | 9/2021 | E06B 3/9641 |
| FR | 2529626 | A | * | 1/1984 | E06B 11/02 |
| FR | 2799226 | A1 | * | 4/2001 | E05D 5/14 |
| GB | 2036912 | A | * | 7/1980 | E06B 3/5821 |
| GB | 2118668 | A | * | 11/1983 | E06B 3/5821 |
| GB | 2492815 | A | * | 1/2013 | |
| JP | 2017078557 | A | * | 4/2017 | A47F 3/04 |
| WO | 03019076 | A1 | | 3/2003 | |
| WO | WO-03019076 | A1 | * | 3/2003 | E06B 3/6621 |
| WO | WO-2016119149 | A1 | * | 8/2016 | A47K 3/34 |
| WO | WO-2017068890 | A1 | * | 4/2017 | A47F 3/04 |
| WO | WO-2020122871 | A1 | * | 6/2020 | E06B 3/9681 |
| WO | WO-2021065396 | A1 | * | 4/2021 | |

OTHER PUBLICATIONS

PCT Application: PCT/EP2020/052029 Filed Jan. 28, 2020—International Search Report dated May 4, 2020.

Priority Application: DE 10 2019 102 291.6 Filed Jan. 30, 2019—German Search Report dated Sep. 12, 2019.

* cited by examiner

PANE UNIT AND METHOD USED TO PRODUCE AND/OR SUPPLY SUCH A PANE UNIT

CLAIM OF PRIORITY

The present application claims priority to International Application PCT/EP2020/052029, filed Jan. 28, 2020, which in turn claims priority to German Applications DE 10 2019 102 291.6, filed Jan. 30, 2019, and DE 10 2019 130 580.2, filed Nov. 13, 2019, which are incorporated by reference.

FIELD OF THE INVENTION

The present invention relates to a pane unit as well as to a method used to produce and/or supply such a pane unit according to the features of the independent claims.

BACKGROUND OF THE INVENTION

From the prior art, pane units are known in which the frame structure is either designed without chambers and/or in which there are frame structures with chambers for gases, liquids, and/or solids, which chambers, however, are cumbersome and costly to open, close, and seal, as the case may be, for example, for maintenance purposes.

It has proven disadvantageous for frame structures of pane units if it is not possible to open, close, and seal, as the case may be, existing chambers or parts thereof in a simple and flexible manner at the corners and/or along the edges.

This can be a problem, in particular, for placing optical elements, such as functional elements used for illuminating, on or in one or more panes, because in customary frame structures, for example, the transition between the frame structure and the at least one illuminated pane is not transparent, and because the electrical supply and the corresponding heat conduction can only be carried out insufficiently.

WO 2019/096872 A1, for example, discloses an already known pane unit. The pane unit described in the patent application is formed from a plurality of transparent layers, with an illuminable panel of transparent material being arranged between two glass panels that are held apart at a defined distance by a spacing element. The spacing element is formed by a hollow profile having a plurality of hollow chambers, and the illuminable panel rests with its longitudinal outer edge on the middle hollow chamber. In the middle hollow chamber, a functional element is moreover provided, which, in the activated state, illuminates the outer edge of the illuminable panel. An interior space of the middle hollow chamber together with the illumination element located therein is gas-tightly closed. For the pane unit, however, it has proven disadvantageous that the connection element has to be removed in order to access the functional element for maintenance purposes. Removing the connection element between the profiles or between the spacers causes the hermetic seal of the pane unit to be broken up. After the exchange of the functional element, the hermetic seal of the pane unit thus has to be produced again in a time-consuming and costly procedure.

US 2007/0177391 A1 discloses a further pane unit, which comprises a spacer as well as panes arranged spaced apart by the spacer. A functional element is placed into the middle chamber of the spacer. The hermetic sealing of the pane unit is achieved by a sealing means. In order to exchange the functional element, the sealing means has to be removed, whereby in turn the hermetic seal of the pane unit is no longer effective. Conversely, the hermetic seal also has to be renewed for this pane unit after exchanging the functional element.

The invention is therefore based on the problem of providing a pane unit by which the mentioned disadvantages in the prior art are overcome, and by which the pane unit, in particular the frame structure thereof, can be opened, closed, and sealed, as the case may be, for maintenance purposes in a simple and flexible manner at least at one corner and/or along at least one of the edges. Furthermore, a method is to be provided by which the pane unit can be produced in a cost-efficient and simple manner.

These objects of the invention are solved by a pane unit and by a method used to produce and/or supply a pane unit according to the features of the independent claims. Further advantageous embodiments of the invention are described in the subclaims.

SUMMARY OF THE INVENTION

The invention relates to a pane unit, comprising a frame structure formed from a plurality of profiles as well as at least two outer panes and at least one middle pane, which are connected and/or attached to the frame structure and/or to the profiles.

The at least two outer panes and the at least one middle pane can be designed to be transparent. The panes can be made from polymethyl methacrylate, for example. Other materials are optionally also conceivable.

The pane unit furthermore comprises at least one functional element for the illumination of the at least one pane, which is inserted in at least one chamber provided in the profile or in the profiles. The at least one chamber provided in the profile or in the profiles, can thus provide a receptacle for the at least one functional element.

In this context, it is provided that the plurality of profiles are coupled with each other by at least one connection element, with the at least one connection element engaging with the profiles in such a manner that the pane unit is hermetically sealed.

It is provided for the pane unit that the at least one connection element comprises at least one recess, in particular, on at least one end face, which recess is closable and/or openable by a corresponding cover element, with the at least one recess of the at least one connection element being arranged aligned with the at least one chamber or with the receptacle for the at least one functional element, and with the at least one functional element being passable through the recess and insertable into the at least one chamber in order to illuminate the at least one middle pane.

The at least one recess of the at least one functional element can preferably comprise a cross section corresponding at least approximately to the cross section of the functional element or being formed greater than the cross section of the functional element.

The at least one functional element can comprise, for example, a round, square, or rectangular cross section. Accordingly, the at least one recess can likewise comprise a round, square, or rectangular cross section. The cross sections mentioned here of the at least one functional element and/or of the at least one recess are not to be understood in a restrictive sense. The at least one functional element and/or the at least one recess can of course also comprise other cross sections.

It is alternatively conceivable that the at least one functional element and the at least one recess have different cross sections. In this embodiment, however, it is important that the cross section of the at least one recess is big enough or designed in such a manner for the at least one functional element to be passable through the at least one recess.

By the cover element, the at least one connection element can be opened and/or openable at the at least one end face or at the side walls thereof such that maintenance of the profiles or of parts or of at least one functional unit thereof is possible in a simple and cost-efficient manner. It is possible, for example, to exchange the at least one functional element in a simple manner. Opening or removing the recess, however, does not interfere with the hermetic sealing of the pane unit, because the hermetic sealing of the pane unit persists by the at least one connection element.

The cover element can be designed, for example, in the form of a flap, lid, or the like. In particular, the cover element can be designed to correspond to the cross section of the at least one recess.

Alternatively, the at least one connection element can comprise at least one recess on both end faces, with the recess each being closable and/or openable by a corresponding cover element. In this case, the maintenance of the pane unit and, in particular, of the profiles as well as of the at least one functional unit can be carried out on two sides.

After the maintenance procedure, the at least one recess can be closed and, as required, accordingly sealed by the corresponding cover element.

An optional embodiment variant of the pane unit results from one or more profiles being designed entirely or partly in the form of spacers between the panes.

Moreover, the at least one connection element can comprise a couple element, which engages with the at least one chamber of the profiles in such a manner that the connection element is in flush contact with the particular end face of the particular profile.

It can be moreover provided that the profiles comprise at least two further chambers, between which a receptacle for the at least one middle pane is formed. The at least two chambers can be arranged along the longitudinal direction of the particular profile, and they can be arranged, in particular, parallel to each other. In particular, the at least two chambers can each be arranged on an inner surface of the profile.

It can be moreover provided that the at least one connection element comprises at least two further couple elements, which engage with the at least two further chambers in such a manner that the at least one connection element is in flush contact with an end face of the particular profile.

The at least two further two couple elements can be designed in a clip-like, rippled, or spring-like manner, such as snap-fit or pressure-fit fasteners. Thereby, the at least two further couple elements and the profiles can be connected to each other in a particularly simple and cost-efficient manner. This connection can no longer become detached during the assembly of the frame structure for pane elements. Other embodiments of the at least two further couple elements are alternatively conceivable, such that a detachable connection is formed between connection element and profile.

It should be pointed out here once more that the recess of the at least one connection element is, in particular, arranged to be aligned with the at least one receptacle for the at least one functional element; that is to say that the at least one functional element can be passed through or passable through the receptacle of the at least one connection element and can be inserted or insertable for the purpose of illumination on or in the at least one pane.

Moreover, an inner surface of the profiles, in particular, an inner surface between the at least two further chambers, can at least be partly designed in a transparent manner. In this way, the at least one middle pane can be illuminated by the at least one functional element.

The maintenance of the at least one functional element can consequently be carried out in a simple manner because it is only necessary to open the at least one recess of the at least one connection element and to thus remove the corresponding cover element. In this way, the at least one functional element can be inserted into or extracted from the at least one chamber or it can be exchanged, if required, in a simple and cost-efficient manner.

For optimizing the stability of the frame structure in connection with the pane unit, it is optionally possible for an embodiment variant to have at least one of the two outer panes designed to be smaller in order to enable a simple and cost-efficient access on this side via the recess in the particular profile, while the other pane of the at least two outer panes, which is on the other side, is designed in full size in order to preserve the stability as much as possible.

The at least one functional element can be, in particular, an illumination unit, such as an LED board or the like.

Furthermore, at least one opening can be provided in the cover element of the at least one recess and/or in the at least one connection element and/or in the particular profile, through which opening the power supply for the at least one functional element is conductible.

It can be furthermore provided that at least one profile is constructed so as to have at least one jagged outer side in order to increase the surface area thereof for optimal heat dissipation.

Additionally or optionally, at least one outer side of at least one profile can be designed entirely or partly with a black surface in order to minimize the heat transfer resistance and allow optimal heat dissipation.

Furthermore, the at least one connection element can form a corner profile and/or can be designed to be rectangular. It is also conceivable that the plurality of profiles can be connected to non-rectangular connection elements and thus be designed with an optional number of connection elements and profiles.

The cavities formed between the at least two outer panes and the at least one middle pane can be filled with at least one filler medium, in particular, with gases, liquids, and/or solids, such as drying agents, for example. The cavities can alternatively be vacuumed.

The connection elements or the plurality of profiles can be designed in such a manner that at least one seal of the at least one middle pane is preserved even when the cover element of at least one recess of the connection element and thus of a profile is opened. For this purpose, a sealed connection between at least one connection element and at least one profile is produced by fitting at least one seal element on the connection element.

In particular, the at least one connection element can comprise at least one depression, into which at least one seal element is insertable such that a sealing and/or capping connection is formed between the connection element and the profile.

The at least one depression can be formed by a groove or the like. The at least one depression can preferably also have other geometries into which at least one seal is insertable in order to form a seal.

The at least one depression can be located on the side of the at least one connection element facing the profile. In one embodiment, sealing of the pane unit, in particular of the profile, can be carried out from inside. Alternatively, the at least one depression can also be located on the side of the at least one connection element facing away from the profile;

that is to say, in this embodiment sealing of the pane unit, in particular, of the profile, can be carried out from outside.

Other combinations of the previously mentioned embodiment variants used to seal the pane unit are of course also conceivable, where the pane unit can be sealed or is sealable both from the outside and from the inside. In such an embodiment, the at least one connection element can comprise at least two depressions, with at least one depression being provided on a side facing the profile and at least one depression one a side facing away from the profile.

It is alternatively conceivable to assign at least one seal element to at least one of the at least two couple elements. Preferably, at least one seal element is assigned to each of the at least two couple elements. The at least one seal element can be applied at least in sections on at least one, in particular, on at least two couple elements.

In particular, the at least one seal element can be formed by a sealing compound. The sealing compound can be butyl, in particular.

The maintenance of at least one of the plurality of profiles or of parts thereof is thus possible without opening, destroying, or piercing the sealing area of the at least one middle pane and/or of the cavities. This is intended to allow simple and cost-efficient maintenance.

Furthermore, the cover element of the at least one recess of the connection element can be formed to be hermetically sealing, in particular, to be gas-tight, liquid-tight, or solids-tight. In this way it is possible, for example, to exchange the particular medium in the profiles or in parts thereof in a simple and cost-efficient manner. After the exchange, the at least one cover can be placed back on and be appropriately sealed. In this context, it should also be pointed out that the at least one opening of the cover element, which opening the power supply of the at least one functional element is passable through, is likewise sealable by at least one further seal, in particular, by a sealing compound in the form of butyl, for example.

The invention furthermore relates to a method used to produce and/or supply a pane unit, the method comprising at least the following steps:

To begin with, a plurality of profiles is supplied. The plurality of profiles are subsequently connected and/or coupled by at least one connection element such that a frame structure is formed, with at least two outer panes and at least one middle pane being connected and/or attached to the frame structure or to the profiles temporally before the frame structure is formed.

Subsequently, at least one functional element is inserted into at least one chamber provided in the profiles in order to illuminate the at least one middle pane. The chamber can also provide a receptacle for the at least one functional element.

In this context, it is provided that the profiles are coupled by the at least one connection element in such a manner that the pane unit is hermetically sealed, and the at least one connection element comprises at least one recess on at least one end face, which recess can be closed and/or opened by a corresponding cover element, with at least one recess of the at least one connection element being arranged aligned with the at least one receptacle for the at least one functional element, with the at least one functional element being passed through the recess and inserted into the at least one chamber in order to illuminate the at least one middle pane.

Two connection elements can be fitted to two profiles of a rectangular frame, for example. One further profile can be fitted to the two connection elements of a profile such that a U-shaped body results. Finally, the prepared second profile is fitted onto the U-shaped body with two connection elements.

Furthermore, the profiles and/or the cavities between the at least two outer panes and the at least one inner pane can be filled with at least one filler, in particular, with a gaseous and/or liquid medium. The profiles and/or the cavities can be filled with a drying agent, for example. The cavities can optionally be vacuumed.

It is also possible to provide the at least one connection element and/or the particular profile with at least one seal element such that a sealing and/or capping connection is formed between the mentioned components.

The profiles and/or the cavities are filled, for example, with a drying agent and, in order to add an optical element, for example, optionally sealed on the inside with at least one seal element and/or sealing compound. In particular, connection elements can be prepared for future gas tightness with sealing compound, such as butyl, for example, in the small depressions. For a transparent transition from the profile to at least one of the panes, an optical element can optionally be placed in the profile and sealed with sealing compound, for example, with butyl.

In the instance of a rectangular frame, two connection elements can be fitted to two prepared profiles such that a sealed connection results together with the previously applied sealing compound, for example, butyl. A further prepared profile can be fitted on the two connection elements of a profile such that a sealed, U-shaped body results. Finally, the prepared second profile can be fitted onto the U-shaped body with two connection elements such that a sealed connection results here, too.

It is optionally possible to fit at least one middle pane before the final profile in the U-shaped body, whereby optical effects, such as an illumination, become possible on or in the pane. In this connection, the at least one middle pane can tightly connect to the optical element, which is sealed with butyl, for example. Finally, the prepared second profile can be fitted onto the U-shaped body with two connection units, and a tight connection with sealed optical elements can likewise result in this context. The previous construction can thereby be prepared for a sealed structure. A standard assembly of the further components of the pane unit can then be carried out in an assembly station: A sealing compound, for example butyl, can be applied on the outside onto the profiles; the outer panes can be glued and a secondary seal can be optionally fitted in order to increase stability.

Alternatively, the at least one pane can be connected to the profile and/or to the connection element by a "warm-edge" method.

In particular, the pane unit can be designed according to one of the claims 1 to 7 and/or can be produced by a method according to claim 8.

It should be explicitly mentioned at this point that all aspects and embodiment variants explained in the context of the device according to the invention can likewise pertain to or constitute partial aspects of the method according to the invention. If specific aspects and/or interrelations and/or effects relating to the pane unit according to the invention are referred to at some point in the present description or in the claims definitions, this therefore likewise pertains to the method according to the invention. The same applies conversely, so that all aspects and embodiment variants explained in the context of the method according to the invention can likewise pertain to or constitute partial aspects of the pane unit according to the invention. If specific aspects and/or interrelations and/or effects relating to the method according to the invention are referred to at some point in the present description or in the claims definitions, this therefore likewise pertains to the pane unit according to the invention.

BRIEF DESCRIPTION OF THE FIGURES

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

Figure 1:
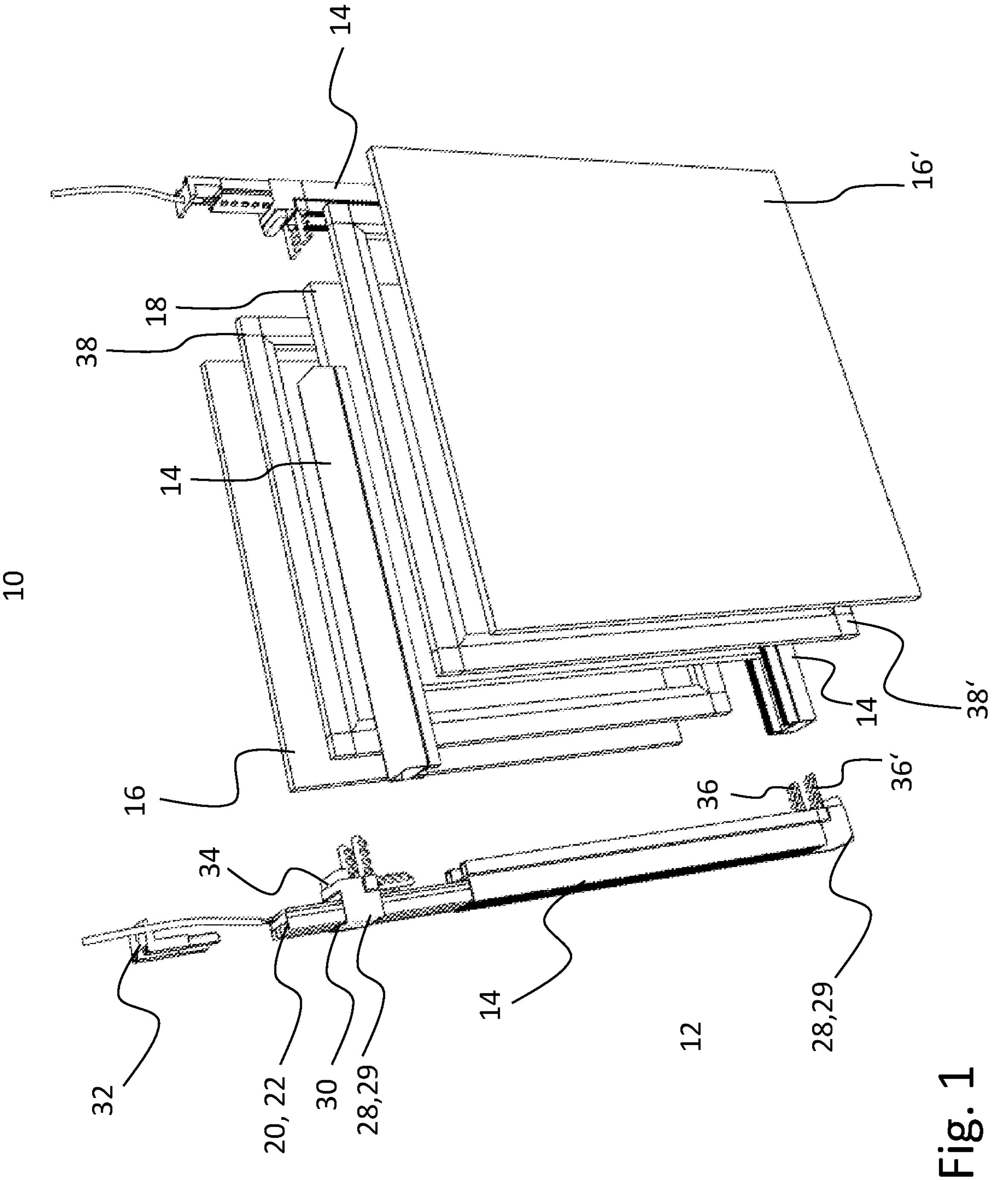
FIG. 1 shows an embodiment of a pane unit according to the invention in a perspective exploded view.

In the following passages, the attached figures further illustrate typical embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

The same or equivalent elements of the invention are designated using identical reference characters. Furthermore and for the sake of clarity, only the reference characters relevant for describing the individual figures are provided. It should be understood that the detailed description and specific examples of the pane unit and the method, while indicating preferred embodiments for the purpose of the invention, are intended for purposes of illustration only and are not intended to limit the scope of the invention.

DETAILED DESCRIPTION OF THE INVENTION

Figure 2:
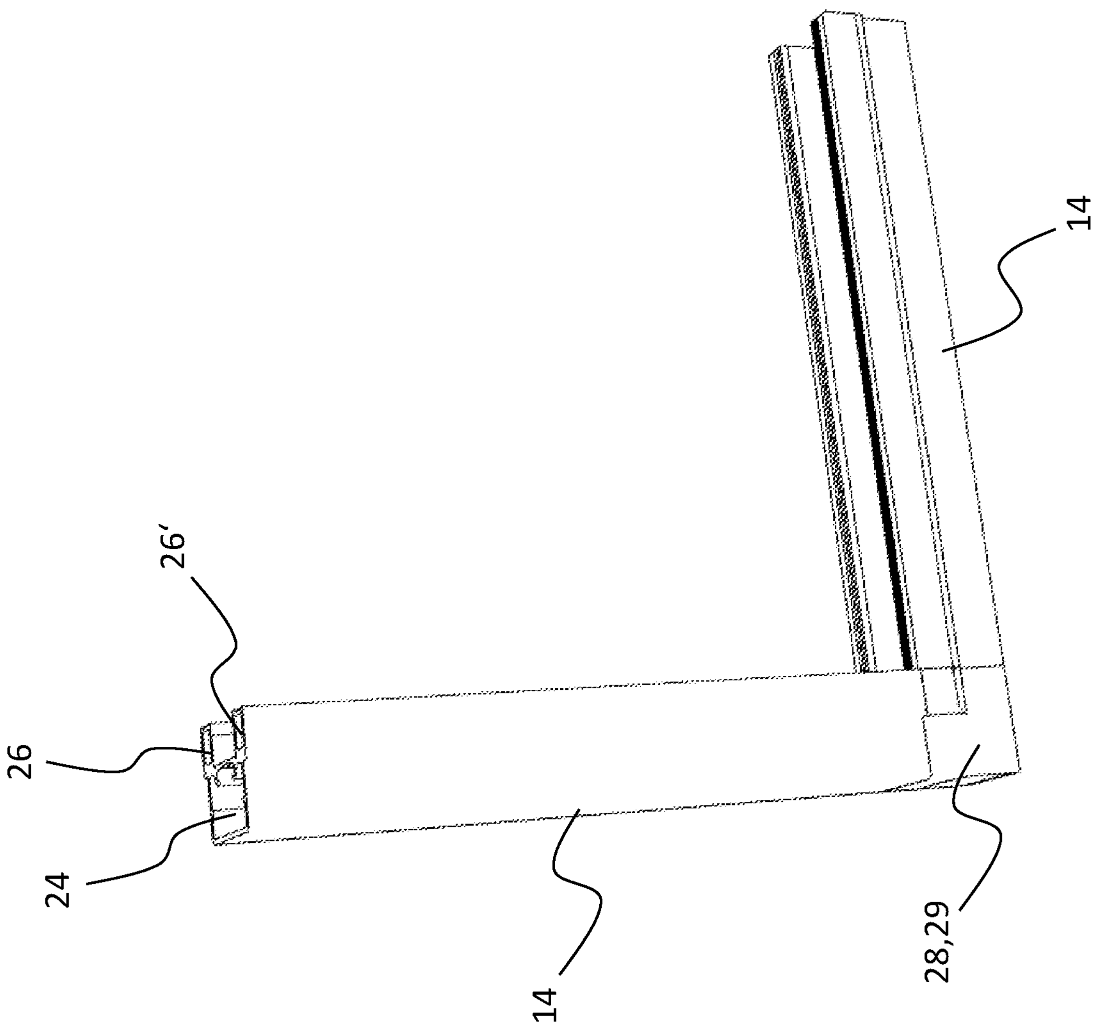
FIG. 2 shows a detail of the pane unit according to the invention in a perspective view.

The FIG. 1 shows an embodiment of the pane unit 10 according to the invention in a perspective exploded view, and the FIG. 2 shows a detail of the pane unit 10 in a perspective view. The pane unit 10 comprises a frame structure 12 formed from four profiles 14, which normally abut on each other at angles of 90° and which are connected to each other. In practice, however, other pane variants are also conceivable in which the pane frames do not have a rectangular or square outline. The invention is applicable in the same manner to such deviating forms and variants.

The pane unit 10 furthermore comprises at least two outer panes 16, 16' and at least one middle pane 18, which panes are connected and/or attached to the frame structure 12 or to the profiles 14. The at least two outer panes 16, 16' and the middle pane 18 are designed, in particular, in a transparent manner; the pane unit 10 can thus be a window for buildings.

The at least two outer panes 16, 16' are each arranged in a frame 38, 38' and attached to the profiles 14 via the frames 38, 38', for example, by a glued joint.

The pane unit 10 moreover comprises at least one functional element 20 for the illumination of the at least one middle pane 18, which is inserted in at least one chamber 24 provided in the profile 14 or in the profiles 14. The at least one chamber 24 extends preferably along the longitudinal direction of the particular profile 14.

The profiles 14 are coupled by at least one connection element 28, with the at least one connection element 28 engaging with the profiles 14 in such a manner that the pane unit 10 is thereby hermetically sealed.

The at least one connection element 28 comprises at least one recess 30, in particular, on at least one end face, with the recess 30 being closable and/or openable by a corresponding cover element 32. By the cover element 32, the at least one connection element 28 is openable at the end face or at the sidewall thereof, in such a manner that a maintenance of one of the profiles 14 or of parts thereof is possible in a simple and cost-efficient manner.

The cover element 32 can be designed, for example, in the form of a flap or a lid or the like. The cover element 32 is designed to correspond to the at least one recess 30 of the at least one connection element 28.

After the maintenance procedure, the at least one recess 30 is closable and, as required, sealable by the corresponding cover element 32.

The at least one connection element 28 moreover comprises a couple element 34, which engages with the at least one chamber 24 of the profiles 14 in such a manner that the connection element 28 is in flush contact with the particular end face of the particular profile 14.

The profiles 14 comprise at least two further chambers 26, 26', between which a receptacle for the at least one middle pane 18 is formed. The at least two further chambers 26, 26' are arranged along the longitudinal direction of the particular profile 14, and they are arranged, in particular, parallel to each other. In particular, the at least two chambers 26, 26' are arranged on an inner surface of the profiles 14.

The at least one connection element 28 comprises at least two further couple elements 36, 36', which engage with the at least two further chambers 26, 26' of the profiles 14, in such a manner that the at least one connection element 28 is in flush contact with an end face of the particular profile 14.

The at least two further couple elements 36, 36' are formed in a clip-like manner, such as snap-fit or pressure-fit fasteners. Thereby, the at least two further couple elements 36, 36' of the at least one connection element 28 and the profiles 14 can be connected to each other in a particularly simple and cost-efficient manner. This connection can no longer become detached during the assembly of the frame structure 12 for pane elements.

The at least one recess 30 of the at least one connection element 28 is, in particular, arranged aligned with the at least one receptacle for the at least one functional element 20; that is to say that the at least one functional element 20 is passable through the recess 30 and insertable into the at least one chamber 24 in order to illuminate the at least one middle pane 18.

The inner surface of the profiles 14, in particular, an inner surface between the at least two further chambers 26, 26', is at least partly designed in a transparent manner. In this way, the at least one middle pane 18 is illuminated by the at least one functional element 20.

The maintenance of the at least one functional element 20 is thus carried out in a simple manner because it is only necessary to open the at least one recess 30 and to thus remove the cover element 32. In this way, the at least one functional element 20 is insertable into or extractable from the at least one chamber 24 of the profiles 14 in a simple and cost-efficient manner without the hermetic sealing of the pane unit 10 being broken up in the process.

The at least one functional element 20 can be, in particular, an illumination unit, such as an LED board 22 or the like.

At least one opening is provided in the cover element 32 of the at least one recess 30 and/or in the at least one connection element 28 and/or in the particular profile 14, through which opening the power supply for the at least one functional element 20 is conductible. If required, the opening can also be sealed by an appropriate seal. Sealing compounds, for example in the form of butyl, are among others suitable for this purpose.

In particular, at least one profile 14 is constructed so as to have at least one jagged outer side in order to increase the surface area thereof for optimal heat dissipation.

Additionally or optionally, at least one outer side of at least one profile 14 is designed entirely or partly with a black surface in order to minimize the heat transfer resistance and allow optimal heat dissipation.

The cavities formed between the at least two outer panes 16, 16' and the at least one middle pane 18 are fillable with at least one filler medium, in particular, with a gas, a liquid, and/or solids, such as a drying agent, for example.

The connection elements 28 or the plurality of profiles 14 are designed in such a manner that at least one sealing level and/or seal of the at least one middle pane 18 is preserved even when the cover element 32 of at least one recess 30 of the connection element 28 and thus of a profile 14 is opened. For this purpose, a sealed connection between at least one connection element 28 and at least one profile 14 is produced by fitting at least one seal element (not illustrated here) on the connection element 28.

In particular, the at least one connection element 28 comprises at least one depression 29, into which at least one seal element is insertable such that a sealing and/or capping connection is formed between the connection element 28 and the profile 14.

The at least one depression 29 can be located on the side of the at least one connection element 28 facing the profile 14. In this context, sealing of the pane unit 10, in particular of the particular profile 14, can be carried out from inside. Alternatively, the at least one depression 29 can also be located on the side of the at least one connection element 28 facing away from the profile 14 such that in this context sealing of the pane unit 10, in particular of the particular profile 14, is carried out from outside.

The at least one seal element is formed, in particular, by a sealing compound, such as butyl, for example.

The maintenance of at least one of the plurality of profiles 14 or parts thereof is thus possible without opening, destroying, or piercing the sealing area of the at least one middle pane 18 and/or of the cavities. As a result, simple and cost-efficient maintenance is possible.

Furthermore, the cover element 32 of the at least one recess 30 of the connection element 28 is formed in such a manner that the cover element 32 hermetically seals the profiles 14.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

If illustrations and aspects are generally referred to as being "schematic" in the context of the figures, this is by no means intended to imply that the illustration of the figures and their description are of inferior significance with regard to the disclosure of the invention. The person skilled in the art is fully capable of gathering sufficient information from the schematically and abstractly drawn illustrations for facilitating the understanding of the invention without the understanding being in any way impaired by, for example, the size ratios of the drawings of the pane construction and/or of parts of the device or of other of the elements being drawn and being potentially not precisely true to scale. On the basis of the more concretely explained realizations of the method according to the invention and on the basis of the more concretely explained functionality of the device according to the invention in the figures, the person skilled in the art as a reader is thus enabled to derive a better understanding of the inventive idea, which is formulated in a more general and/or more abstract manner in the claims and in the general part of the description.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

10 Pane unit
12 Frame structure
14 Profile
16 Outer pane
16' Outer pane
18 Middle pane
20 Functional element, illumination element
22 LED board
24 Chamber
26 Further chamber
26' Further chamber
28 Connection element
29 Depression
30 Recess
32 Cover element
34 Couple element
36 Further couple element
36' Further couple element
38 Frame
38' Frame

The invention claimed is:

1. A pane unit (10), comprising:

a frame structure (12) formed from a plurality of profiles (14), at least two outer panes (16, 16') and at least one middle pane (18), wherein the panes are each connected or attached to the frame structure (12), at least one illumination unit (20) used for the illumination of the at least one middle pane (18), which illumination unit (20) is inserted into at least one chamber (24) provided in the profiles (14), wherein it is provided that the plurality of profiles (14) are coupled with each other by at least one connection element (28), wherein the at least one connection element (28) in each case engages with the profiles (14) in such a manner that the pane unit (10) is hermetically sealed, and wherein the at least one connection element (28) comprises at least one recess (30) on at least one end face, which recess (30) is closable or openable by a cover element (32), which cover element (32) is in the form of a flap or a lid, wherein the at least one recess (30) of the at least one connection element (28) is aligned with at least one receptacle for the at least one illumination unit (20), wherein the at least one illumination unit (20) is passable through the recess (30) and insertable into the at least one chamber (24).

2. The pane unit of claim 1, wherein each profile (14) comprises at least two further chambers (26, 26'), which are arranged parallel to or along the longitudinal direction of each profile (14).

3. The pane unit of claim 2, wherein the at least one connection element (28) comprises a couple element (34) that engages with the at least one chamber (24) of each profile (14) such that the at least one connection element (28) is in contact with at least one end face of each profile (14).

4. The pane unit of claim 2, wherein the at least one connection element (28) comprises at least two further couple elements (36, 36') that engage with the at least two further chambers (26, 26') such that the connection element (28) is in contact with at least one end face of each profile (14).

5. The pane unit of claim 4, wherein the at least two couple elements (36, 36') are snap-fit or pressure-fit fasteners.

6. The pane unit of claim 1, wherein an inner surface of each profile (14) is at least partly designed to be transparent.

7. The pane unit of claim 6, wherein an inner surface of the profile (14) is an inner surface between the at least two further chambers (26, 26').

8. The pane unit of claim 1, wherein the at least one connection element (28) comprises at least one depression, into which at least one seal element is insertable such that a sealing or capping connection is formed between the connection element and each profile.

9. The pane unit (2) of claim 1, wherein the cover element corresponds to the cross section of the at least one recess.

10. A method of producing a pane unit (10), comprising:

coupling of a plurality of profiles (14) by at least one connection element (28) such that a frame structure (12) is formed, wherein, temporally before the frame structure (12) is formed, at least two outer panes (16, 16') and at least one middle pane (18) are connected or attached to the plurality of profiles (14), inserting at least one illumination unit (20) into at least one chamber (26) in the profile (14) of at least one of the plurality of profiles in order to illuminate the at least one middle pane (18), wherein it is provided that the profiles (14) are coupled by the at least one connection element (28) in such a manner that the pane unit (10) is hermetically sealed, and wherein the at least one connection element (28) comprises at least one recess (30) on at least one end face, which recess (30) can be closed or opened by a cover element (32), which cover element (32) is in the form of a flap or a lid, wherein at least one recess (30) is aligned with at least one receptacle for the at least one illumination unit (20), wherein the at least one illumination unit (20) is passed through the recess (30) and inserted into the at least one chamber (24).

11. The method of claim 10, wherein each profile (14) comprises at least two further chambers (26, 26'), which are arranged parallel to or along the longitudinal direction of each profile (14).

12. The method of claim 11, wherein the at least one connection element (28) comprises a couple element (34) that engages with the at least one chamber (24) of each profile (14) such that the at least one connection element (28) is in contact with at least one end face of each profile (14).

13. The method of claim 11, wherein the at least one connection element (28) comprises at least two further couple elements (36, 36') that engage with the at least two further chambers (26, 26') such that the connection element (28) is in contact with at least one end face of each profile (14).

14. The method of claim 13, wherein the at least two couple elements (36, 36') are snap-fit or pressure-fit fasteners.

15. The method of claim 10, wherein an inner surface of each profile (14) is at least partly designed to be transparent.

16. The method of claim 15, wherein an inner surface of the profile (14) is an inner surface between the at least two further chambers (26, 26').

17. The method of claim 10, wherein the at least one connection element (28) comprises at least one depression, into which at least one seal element is insertable such that a sealing or capping connection is formed between the connection element and each profile.

18. The method of claim 10, wherein the cover element corresponds to the cross section of the at least one recess.

* * * * *